(12) United States Patent
Lockton (10) Patent No.: US 11,551,529 B2
(45) Date of Patent: Jan. 10, 2023

(54) METHOD OF GENERATING SEPARATE CONTESTS OF SKILL OR CHANCE FROM TWO INDEPENDENT EVENTS

(71) Applicant: Winview, Inc., Redwood City, CA (US)

(72) Inventor: David B. Lockton, Redwood City, CA (US)

(73) Assignee: Winview, Inc., Redwood City, CA (US)

( * ) Notice: Subject to any disclaimer, the term of this patent is extended or adjusted under 35 U.S.C. 154(b) by 0 days.

(21) Appl. No.: 15/608,648

(22) Filed: May 30, 2017

(65) Prior Publication Data

US 2018/0025586 A1  Jan. 25, 2018

Related U.S. Application Data

(60) Provisional application No. 62/364,768, filed on Jul. 20, 2016.

(51) Int. Cl.
*G07F 17/32* (2006.01)
*A63F 13/335* (2014.01)
*A63F 13/332* (2014.01)
*A63F 13/828* (2014.01)

(52) U.S. Cl.
CPC ........ *G07F 17/3279* (2013.01); *A63F 13/332* (2014.09); *A63F 13/335* (2014.09); *A63F 13/828* (2014.09); *G07F 17/3288* (2013.01)

(58) Field of Classification Search
CPC ............. G07F 17/3279; G07F 17/3288; A63F 13/332; A63F 13/335; A63F 13/79
See application file for complete search history.

(56) References Cited

U.S. PATENT DOCUMENTS

| | | |
|---|---|---|
| 2,831,105 A | 4/1958 | Parker |
| 3,562,650 A | 2/1971 | Gossard et al. |
| 4,141,548 A | 2/1979 | Everton |
| 4,270,755 A | 6/1981 | Willhide et al. |
| 4,386,377 A | 5/1983 | Hunter, Jr. |
| 4,496,148 A | 1/1985 | Morstain et al. |

(Continued)

FOREIGN PATENT DOCUMENTS

| | | |
|---|---|---|
| CA | 2252074 | 11/1997 |
| CA | 2252021 | 11/1998 |

(Continued)

OTHER PUBLICATIONS

Fantasy sport—Wikipedia.pdf, https://en.wikipedia.org/w/index.php?title=Fantasy_sport&oldid=685260969 (Year: 2015).*

(Continued)

*Primary Examiner* — Yingchuan Zhang
(74) *Attorney, Agent, or Firm* — Haverstock & Owens, A Law Corporation (57) ABSTRACT

The systems and methods to generate and manage a separate contest based on two independent and unconnected systems utilize a cooperating fantasy league operator/provider and either a related or separate real-time contest provider. Separate winners for a third contest are determined by combining the performance in a specified daily fantasy league competition and a separate pre-specified performance in a real-time competition.

86 Claims, 3 Drawing Sheets

```
┌─────────────────────────────────────────┐
│ Selecting/generating a first competition.│ ─── 100
└─────────────────────────────────────────┘
                    │
                    ▼
┌─────────────────────────────────────────┐
│Selecting/generating a second competition.│ ─── 102
└─────────────────────────────────────────┘
                    │
                    ▼
┌─────────────────────────────────────────┐
│ Processing separate gaming information.  │ ─── 104
└─────────────────────────────────────────┘
```

(56) References Cited

U.S. PATENT DOCUMENTS

| | | |
|---|---|---|
| 4,521,803 A | 6/1985 | Gittinger |
| 4,592,546 A | 6/1986 | Fascenda et al. |
| 4,816,904 A | 3/1989 | McKenna et al. |
| 4,918,603 A | 4/1990 | Hughes et al. |
| 4,930,010 A | 5/1990 | MacDonald |
| 5,013,038 A | 5/1991 | Luvenberg |
| 5,018,736 A | 5/1991 | Pearson et al. |
| 5,035,422 A | 7/1991 | Berman |
| 5,073,931 A | 12/1991 | Audebert et al. |
| 5,083,271 A | 1/1992 | Thatcher et al. |
| 5,083,800 A | 1/1992 | Lockton |
| 5,119,295 A | 6/1992 | Kapur |
| 5,120,076 A | 6/1992 | Luxenberg et al. |
| 5,213,337 A | 5/1993 | Sherman |
| 5,227,874 A | 7/1993 | Von Kohorn |
| 5,256,863 A | 10/1993 | Ferguson |
| 5,263,723 A | 11/1993 | Pearson et al. |
| 5,283,734 A | 2/1994 | Von Kohorn |
| 5,327,485 A | 7/1994 | Leaden |
| 5,343,236 A | 8/1994 | Koppe et al. |
| 5,343,239 A | 8/1994 | Lappington et al. |
| 5,417,424 A | 5/1995 | Snowden |
| 5,462,275 A | 10/1995 | Lowe et al. |
| 5,479,492 A | 12/1995 | Hofstee et al. |
| 5,488,659 A | 1/1996 | Millani |
| 5,519,433 A | 5/1996 | Lappington |
| 5,530,483 A | 6/1996 | Cooper |
| 5,553,120 A | 9/1996 | Katz |
| 5,566,291 A | 10/1996 | Boulton et al. |
| 5,585,975 A | 12/1996 | Bliss |
| 5,586,257 A | 12/1996 | Perlman |
| 5,589,765 A | 12/1996 | Ohmart et al. |
| 5,594,938 A | 1/1997 | Engel |
| 5,618,232 A | 4/1997 | Martin |
| 5,628,684 A | 5/1997 | Jean-Etienne |
| 5,636,920 A | 6/1997 | Shur et al. |
| 5,638,113 A | 6/1997 | Lappington |
| 5,643,088 A | 7/1997 | Vaughn et al. |
| 5,663,757 A | 9/1997 | Morales |
| 5,759,101 A | 6/1998 | Won Kohorn |
| 5,761,606 A | 6/1998 | Wolzien |
| 5,762,552 A | 6/1998 | Vuong et al. |
| 5,764,275 A | 6/1998 | Lappington et al. |
| 5,794,210 A | 8/1998 | Goldhaber et al. |
| 5,805,230 A | 9/1998 | Staron |
| 5,813,913 A | 9/1998 | Berner et al. |
| 5,818,438 A | 10/1998 | Howe et al. |
| 5,828,843 A | 10/1998 | Grimm |
| 5,838,774 A | 11/1998 | Weisser, Jr. |
| 5,838,909 A | 11/1998 | Roy |
| 5,846,132 A | 12/1998 | Junkin |
| 5,848,397 A | 12/1998 | Marsh et al. |
| 5,860,862 A | 1/1999 | Junkin |
| 5,870,683 A | 2/1999 | Wells et al. |
| 5,894,556 A | 4/1999 | Grimm |
| 5,916,024 A | 6/1999 | Von Kohorn |
| 5,970,143 A | 10/1999 | Schneier et al. |
| 5,971,854 A | 10/1999 | Pearson et al. |
| 5,987,440 A | 11/1999 | O'Neil et al. |
| 6,009,458 A | 12/1999 | Hawkins et al. |
| 6,015,344 A | 1/2000 | Kelly et al. |
| 6,016,337 A | 1/2000 | Pykalisto |
| 6,038,599 A | 3/2000 | Black |
| 6,042,477 A | 3/2000 | Addink |
| 6,064,449 A | 5/2000 | White |
| 6,104,815 A | 8/2000 | Alcorn et al. |
| 6,110,041 A | 8/2000 | Walker et al. |
| 6,117,013 A | 9/2000 | Elba |
| 6,126,543 A | 10/2000 | Friedman |
| 6,128,660 A | 10/2000 | Grimm |
| 6,135,881 A | 10/2000 | Abbott et al. |
| 6,154,131 A | 11/2000 | Jones, II |
| 6,174,237 B1 | 1/2001 | Stephenson |
| 6,182,084 B1 | 1/2001 | Cockrell et al. |
| 6,193,610 B1 | 2/2001 | Junkin |
| 6,222,642 B1 | 4/2001 | Farrell et al. |
| 6,233,736 B1 | 5/2001 | Wolzien |
| 6,251,017 B1 | 6/2001 | Leason et al. |
| 6,263,447 B1 | 7/2001 | French |
| 6,267,670 B1 | 7/2001 | Walker |
| 6,287,199 B1 | 9/2001 | McKeown et al. |
| 6,293,868 B1 | 9/2001 | Bernard |
| 6,312,336 B1 | 11/2001 | Handelman et al. |
| 6,343,320 B1 | 1/2002 | Fairchild |
| 6,345,297 B1 | 2/2002 | Grimm |
| 6,371,855 B1 | 4/2002 | Gavriloff |
| 6,373,462 B1 | 4/2002 | Pan |
| 6,411,969 B1 | 6/2002 | Tam |
| 6,416,414 B1 | 7/2002 | Stadelmann |
| 6,418,298 B1 | 7/2002 | Sonnenfeld |
| 6,425,828 B2 | 7/2002 | Walker et al. |
| 6,434,398 B1 | 8/2002 | Inselberg |
| 6,446,262 B1 | 9/2002 | Malaure et al. |
| 6,470,180 B1 | 10/2002 | Kotzin et al. |
| 6,475,090 B2 | 11/2002 | Gregory |
| 6,524,189 B1 | 2/2003 | Rautila |
| 6,527,641 B1 | 3/2003 | Sinclair et al. |
| 6,530,082 B1 | 3/2003 | Del Sesto et al. |
| 6,536,037 B1 | 3/2003 | Guheen et al. |
| 6,578,068 B1 | 6/2003 | Bowman-Amuah |
| 6,594,098 B1 | 7/2003 | Sutardja |
| 6,604,997 B2 | 8/2003 | Saidakovsky et al. |
| 6,610,953 B1 | 8/2003 | Tao et al. |
| 6,611,755 B1 | 8/2003 | Coffee |
| 6,648,760 B1 | 11/2003 | Nicastro |
| 6,659,860 B1 | 12/2003 | Yamamoto et al. |
| 6,659,861 B1 | 12/2003 | Faris |
| 6,659,872 B1 | 12/2003 | Kaufman et al. |
| 6,690,661 B1 | 2/2004 | Agarwal et al. |
| 6,697,869 B1 | 2/2004 | Mallart |
| 6,718,350 B1 | 4/2004 | Karbowski |
| 6,752,396 B2 | 6/2004 | Smith |
| 6,758,754 B1 | 7/2004 | Lavanchy et al. |
| 6,758,755 B2 | 7/2004 | Kelly et al. |
| 6,760,595 B2 | 7/2004 | Inselberg |
| 6,763,377 B1 | 7/2004 | Belknap et al. |
| 6,766,524 B1 | 7/2004 | Matheny et al. |
| 6,774,926 B1 | 8/2004 | Ellis et al. |
| 6,785,561 B1 | 8/2004 | Kim |
| 6,801,380 B1 | 10/2004 | Sutardja |
| 6,806,889 B1 | 10/2004 | Malaure et al. |
| 6,807,675 B1 | 10/2004 | Millard et al. |
| 6,811,482 B2 | 11/2004 | Letovsky |
| 6,811,487 B2 | 11/2004 | Sengoku |
| 6,816,628 B1 | 11/2004 | Sarachik et al. |
| 6,817,947 B2 | 11/2004 | Tanskanen |
| 6,824,469 B2 | 11/2004 | Allibhoy et al. |
| 6,837,789 B2 | 1/2005 | Garahi et al. |
| 6,837,791 B1 | 1/2005 | McNutt et al. |
| 6,840,861 B2 | 1/2005 | Jordan et al. |
| 6,845,389 B1 | 1/2005 | Sen |
| 6,846,239 B2 | 1/2005 | Washio |
| 6,857,122 B1 | 2/2005 | Takeda et al. |
| 6,863,610 B2 | 3/2005 | Vancraeynest |
| 6,870,720 B2 | 3/2005 | Iwata et al. |
| 6,871,226 B1 | 3/2005 | Ensley et al. |
| 6,873,610 B1 | 3/2005 | Noever |
| 6,884,166 B2 | 4/2005 | Leen et al. |
| 6,884,172 B1 | 4/2005 | Lloyd et al. |
| 6,887,159 B2 | 5/2005 | Leen et al. |
| 6,888,929 B1 | 5/2005 | Saylor |
| 6,893,347 B1 | 5/2005 | Zilliacus et al. |
| 6,898,762 B2 | 5/2005 | Ellis et al. |
| 6,899,628 B2 | 5/2005 | Leen et al. |
| 6,903,681 B2 | 6/2005 | Faris |
| 6,908,389 B1 | 6/2005 | Puskala |
| 6,942,574 B1 | 9/2005 | LeMay et al. |
| 6,944,228 B1 | 9/2005 | Dakss et al. |
| 6,960,088 B1 | 11/2005 | Long |
| 6,978,053 B1 | 12/2005 | Sarachik et al. |
| 7,001,279 B1 | 2/2006 | Barber et al. |
| 7,029,394 B2 | 4/2006 | Leen et al. |
| 7,035,626 B1 | 4/2006 | Luciano, Jr. |
| 7,035,653 B2 | 4/2006 | Simon et al. |

(56) References Cited

U.S. PATENT DOCUMENTS

| | | |
|---|---|---|
| 7,058,592 B1 | 6/2006 | Heckerman et al. |
| 7,076,434 B1 | 7/2006 | Newnam et al. |
| 7,085,552 B2 | 8/2006 | Buckley |
| 7,116,310 B1 | 10/2006 | Zvans et al. |
| 7,117,517 B1 | 10/2006 | Milazzo et al. |
| 7,120,924 B1 | 10/2006 | Katcher et al. |
| 7,124,410 B2 | 10/2006 | Berg |
| 7,125,336 B2 | 10/2006 | Anttila et al. |
| 7,136,871 B2 | 11/2006 | Ozer et al. |
| 7,144,011 B2 | 12/2006 | Asher et al. |
| 7,169,050 B1 | 1/2007 | Tyler |
| 7,185,355 B1 | 2/2007 | Ellis |
| 7,187,658 B2 | 3/2007 | Koyanagi |
| 7,191,447 B1 | 3/2007 | Ellis et al. |
| 7,192,352 B2 | 3/2007 | Walker et al. |
| 7,194,758 B1 | 3/2007 | Waki et al. |
| 7,228,349 B2 | 6/2007 | Barone, Jr. et al. |
| 7,231,630 B2 | 6/2007 | Acott et al. |
| 7,233,922 B2 | 6/2007 | Asher et al. |
| 7,240,093 B1 | 7/2007 | Danieli et al. |
| 7,244,181 B2 | 7/2007 | Wang et al. |
| 7,249,367 B2 | 7/2007 | Bove, Jr. et al. |
| 7,254,605 B1 | 8/2007 | Strum |
| 7,260,782 B2 | 8/2007 | Wallace et al. |
| RE39,818 E | 9/2007 | Slifer |
| 7,283,830 B2 | 10/2007 | Buckley |
| 7,288,027 B2 | 10/2007 | Overton |
| 7,341,517 B2 | 3/2008 | Asher et al. |
| 7,343,617 B1 | 3/2008 | Katcher et al. |
| 7,347,781 B2 | 3/2008 | Schultz |
| 7,351,149 B1 | 4/2008 | Simon et al. |
| 7,367,042 B1 | 4/2008 | Dakss et al. |
| 7,379,705 B1 | 5/2008 | Rados et al. |
| 7,389,144 B1 | 6/2008 | Osorio |
| 7,430,718 B2 | 9/2008 | Gariepy-Viles |
| 7,452,273 B2 | 11/2008 | Amaitis et al. |
| 7,460,037 B2 | 12/2008 | Cattone et al. |
| 7,461,067 B2 | 12/2008 | Dewing et al. |
| 7,502,610 B2 | 3/2009 | Maher |
| 7,510,474 B2 | 3/2009 | Carter, Sr. |
| 7,517,282 B1 | 4/2009 | Pryor |
| 7,534,169 B2 | 5/2009 | Amaitis et al. |
| 7,543,052 B1 | 6/2009 | Cesa Klein |
| 7,562,134 B1 | 7/2009 | Fingerhut et al. |
| 7,602,808 B2 | 10/2009 | Ullmann |
| 7,610,330 B1 | 10/2009 | Quinn |
| 7,614,944 B1 | 11/2009 | Hughes et al. |
| 7,630,986 B1 | 12/2009 | Herz et al. |
| 7,693,781 B2 | 4/2010 | Asher et al. |
| 7,699,707 B2 | 4/2010 | Bahou |
| 7,702,723 B2 | 4/2010 | Dyl |
| 7,711,628 B2 | 5/2010 | Davie et al. |
| 7,729,286 B2 | 6/2010 | Mishra |
| 7,753,772 B1 | 7/2010 | Walker |
| 7,753,789 B2 | 7/2010 | Walker et al. |
| 7,780,528 B2 | 8/2010 | Hirayama |
| 7,828,661 B1 | 11/2010 | Fish |
| 7,835,961 B2 | 11/2010 | Davie et al. |
| 7,860,993 B2 | 12/2010 | Chintala |
| 7,886,003 B2 | 2/2011 | Newman |
| 7,907,211 B2 | 3/2011 | Oostveen et al. |
| 7,907,598 B2 | 3/2011 | Anisimov |
| 7,909,332 B2 | 3/2011 | Root |
| 7,925,756 B1 | 4/2011 | Riddle |
| 7,926,810 B2 | 4/2011 | Fisher et al. |
| 7,937,318 B2 | 5/2011 | Davie et al. |
| 7,941,482 B2 | 5/2011 | Bates |
| 7,941,804 B2 | 5/2011 | Herington |
| 7,976,389 B2 | 7/2011 | Cannon et al. |
| 8,002,618 B1 | 8/2011 | Lockton |
| 8,006,314 B2 | 8/2011 | Wold |
| 8,025,565 B2 | 9/2011 | Leen et al. |
| 8,028,315 B1 | 9/2011 | Barber |
| 8,082,150 B2 | 12/2011 | Wold |
| 8,086,445 B2 | 12/2011 | Wold et al. |
| 8,086,510 B2 | 12/2011 | Amaitis et al. |
| 8,092,303 B2 | 1/2012 | Amaitis et al. |
| 8,092,306 B2 | 1/2012 | Root |
| 8,105,141 B2 | 1/2012 | Leen et al. |
| 8,107,674 B2 | 1/2012 | Davis et al. |
| 8,109,827 B2 | 2/2012 | Cahill et al. |
| 8,128,474 B2 | 3/2012 | Amaitis et al. |
| 8,147,313 B2 | 4/2012 | Amaitis et al. |
| 8,149,530 B1 | 4/2012 | Lockton et al. |
| 8,155,637 B2 | 4/2012 | Fujisawa |
| 8,162,759 B2 | 4/2012 | Yamaguchi |
| 8,176,518 B1 | 5/2012 | Junkin et al. |
| 8,186,682 B2 | 5/2012 | Amaitis et al. |
| 8,204,808 B2 | 6/2012 | Amaitis et al. |
| 8,219,617 B2 | 7/2012 | Ashida |
| 8,240,669 B2 | 8/2012 | Asher et al. |
| 8,246,048 B2 | 8/2012 | Asher et al. |
| 8,267,403 B2 | 9/2012 | Fisher et al. |
| 8,342,924 B2 | 1/2013 | Leen et al. |
| 8,342,942 B2 | 1/2013 | Amaitis et al. |
| 8,353,763 B2 | 1/2013 | Amaitis et al. |
| 8,396,001 B2 | 3/2013 | Jung |
| 8,397,257 B1 | 3/2013 | Barber |
| 8,465,021 B2 | 6/2013 | Asher et al. |
| 8,473,393 B2 | 6/2013 | Davie et al. |
| 8,474,819 B2 | 7/2013 | Asher et al. |
| 8,535,138 B2 | 9/2013 | Amaitis et al. |
| 8,538,563 B1 | 9/2013 | Barber |
| 8,543,487 B2 | 9/2013 | Asher et al. |
| 8,555,313 B2 | 10/2013 | Newman |
| 8,556,691 B2 | 10/2013 | Leen et al. |
| 8,585,490 B2 | 11/2013 | Amaitis et al. |
| 8,632,392 B2 | 1/2014 | Shore et al. |
| 8,634,943 B2 | 1/2014 | Root |
| 8,638,517 B2 | 1/2014 | Lockton et al. |
| 8,641,511 B2 | 2/2014 | Ginsberg et al. |
| 8,659,848 B2 | 2/2014 | Lockton et al. |
| 8,672,751 B2 | 3/2014 | Leen et al. |
| 8,708,789 B2 | 4/2014 | Asher et al. |
| 8,727,352 B2 | 5/2014 | Amaitis et al. |
| 8,734,227 B2 | 5/2014 | Leen et al. |
| 8,771,058 B2 | 7/2014 | Alderucci et al. |
| 8,805,732 B2 | 8/2014 | Davie et al. |
| 8,814,664 B2 | 8/2014 | Amaitis et al. |
| 8,849,225 B1 | 9/2014 | Choti |
| 8,849,255 B2 | 9/2014 | Choti |
| 8,858,313 B1 | 10/2014 | Selfors |
| 9,069,651 B2 | 6/2015 | Barber |
| 9,076,303 B1 | 7/2015 | Park |
| 9,098,883 B2 | 8/2015 | Asher et al. |
| 9,111,417 B2 | 8/2015 | Leen et al. |
| 9,289,692 B2 | 3/2016 | Barber |
| 9,306,952 B2 | 4/2016 | Burman et al. |
| 9,355,518 B2 | 5/2016 | Amaitis et al. |
| 9,406,189 B2 | 8/2016 | Scott et al. |
| 9,430,901 B2 | 8/2016 | Amaitis et al. |
| 9,536,396 B2 | 1/2017 | Amaitis et al. |
| 9,556,991 B2 | 1/2017 | Furuya |
| 9,716,918 B1 | 7/2017 | Lockton et al. |
| 9,805,549 B2 | 10/2017 | Asher et al. |
| 9,878,243 B2 | 1/2018 | Lockton |
| 9,881,337 B2 | 1/2018 | Jaycobs et al. |
| 9,901,820 B2 | 2/2018 | Lockton |
| 10,089,815 B2 | 10/2018 | Asher et al. |
| 10,096,210 B2 | 10/2018 | Amaitis et al. |
| 10,248,290 B2 | 4/2019 | Galfond |
| 10,279,253 B2 | 5/2019 | Lockton |
| 10,360,767 B2 | 7/2019 | Russell et al. |
| 10,569,175 B2 | 2/2020 | Kosai et al. |
| 10,981,070 B2 * | 4/2021 | Isgreen ................ A63F 13/332 |
| 2001/0004609 A1 | 6/2001 | Walker et al. |
| 2001/0005670 A1 | 6/2001 | Lahtinen |
| 2001/0013067 A1 | 8/2001 | Koyanagi |
| 2001/0013125 A1 | 8/2001 | Kitsukawa et al. |
| 2001/0020298 A1 | 9/2001 | Rector, Jr. et al. |
| 2001/0032333 A1 | 10/2001 | Flickinger |
| 2001/0036272 A1 | 11/2001 | Hirayama |
| 2001/0036853 A1 | 11/2001 | Thomas |
| 2001/0044339 A1 | 11/2001 | Cordero |

(56) References Cited

U.S. PATENT DOCUMENTS

| | | |
|---|---|---|
| 2001/0054019 A1 | 12/2001 | de Fabrega |
| 2002/0010789 A1 | 1/2002 | Lord |
| 2002/0018477 A1 | 2/2002 | Katz |
| 2002/0026321 A1 | 2/2002 | Faris |
| 2002/0029381 A1 | 3/2002 | Inselberg |
| 2002/0035609 A1 | 3/2002 | Lessard |
| 2002/0037766 A1 | 3/2002 | Muniz |
| 2002/0069265 A1 | 3/2002 | Bountour |
| 2002/0042293 A1 | 4/2002 | Ubale et al. |
| 2002/0046099 A1 | 4/2002 | Frengut et al. |
| 2002/0054088 A1 | 5/2002 | Tanskanen et al. |
| 2002/0055385 A1 | 5/2002 | Otsu |
| 2002/0056089 A1 | 5/2002 | Houston |
| 2002/0059094 A1 | 5/2002 | Hosea et al. |
| 2002/0059623 A1 | 5/2002 | Rodriguez et al. |
| 2002/0069076 A1 | 6/2002 | Faris |
| 2002/0076084 A1 | 6/2002 | Tian |
| 2002/0078176 A1 | 6/2002 | Nomura et al. |
| 2002/0083461 A1 | 6/2002 | Hutcheson |
| 2002/0091833 A1 | 7/2002 | Grimm |
| 2002/0094869 A1 | 7/2002 | Harkham |
| 2002/0095333 A1 | 7/2002 | Jokinen et al. |
| 2002/0097983 A1 | 7/2002 | Wallace et al. |
| 2002/0099709 A1 | 7/2002 | Wallace |
| 2002/0100063 A1 | 7/2002 | Herigstad et al. |
| 2002/0103696 A1 | 8/2002 | Huang et al. |
| 2002/0105535 A1 | 8/2002 | Wallace et al. |
| 2002/0107073 A1 | 8/2002 | Binney |
| 2002/0108112 A1 | 8/2002 | Wallace et al. |
| 2002/0108125 A1 | 8/2002 | Joao |
| 2002/0108127 A1 | 8/2002 | Lew et al. |
| 2002/0112249 A1 | 8/2002 | Hendricks et al. |
| 2002/0115488 A1 | 8/2002 | Berry et al. |
| 2002/0119821 A1 | 8/2002 | Sen |
| 2002/0120930 A1 | 8/2002 | Yona |
| 2002/0124247 A1 | 9/2002 | Houghton |
| 2002/0132614 A1 | 9/2002 | Vanlujit et al. |
| 2002/0133817 A1 | 9/2002 | Markel |
| 2002/0133827 A1 | 9/2002 | Newnam et al. |
| 2002/0142843 A1 | 10/2002 | Roelofs |
| 2002/0144273 A1 | 10/2002 | Reto |
| 2002/0147049 A1 | 10/2002 | Carter, Sr. |
| 2002/0157002 A1 | 10/2002 | Messerges et al. |
| 2002/0157005 A1 | 10/2002 | Brunk |
| 2002/0159576 A1 | 10/2002 | Adams |
| 2002/0162031 A1 | 10/2002 | Levin et al. |
| 2002/0162117 A1 | 10/2002 | Pearson |
| 2002/0165020 A1 | 11/2002 | Koyama |
| 2002/0165025 A1 | 11/2002 | Kawahara |
| 2002/0177483 A1 | 11/2002 | Cannon |
| 2002/0184624 A1 | 12/2002 | Spencer |
| 2002/0187825 A1 | 12/2002 | Tracy |
| 2002/0198050 A1 | 12/2002 | Patchen |
| 2003/0002638 A1 | 1/2003 | Kaars |
| 2003/0003997 A1 | 1/2003 | Vuong et al. |
| 2003/0013528 A1 | 1/2003 | Allibhoy et al. |
| 2003/0023547 A1 | 1/2003 | France |
| 2003/0040363 A1 | 2/2003 | Sandberg |
| 2003/0054885 A1 | 3/2003 | Pinto et al. |
| 2003/0060247 A1 | 3/2003 | Goldberg et al. |
| 2003/0066089 A1 | 4/2003 | Anderson |
| 2003/0069828 A1 | 4/2003 | Blazey et al. |
| 2003/0070174 A1 | 4/2003 | Solomon |
| 2003/0078924 A1 | 4/2003 | Liechty et al. |
| 2003/0086691 A1 | 5/2003 | Yu |
| 2003/0087652 A1 | 5/2003 | Simon et al. |
| 2003/0088648 A1 | 5/2003 | Bellaton |
| 2003/0114224 A1 | 6/2003 | Anttila et al. |
| 2003/0115152 A1 | 6/2003 | Flaherty |
| 2003/0125109 A1 | 7/2003 | Green |
| 2003/0134678 A1 | 7/2003 | Tanaka |
| 2003/0144017 A1 | 7/2003 | Inselberg |
| 2003/0154242 A1 | 8/2003 | Hayes et al. |
| 2003/0165241 A1 | 9/2003 | Fransdonk |
| 2003/0177167 A1 | 9/2003 | Lafage et al. |
| 2003/0177504 A1 | 9/2003 | Paulo et al. |
| 2003/0189668 A1 | 10/2003 | Newnam et al. |
| 2003/0195023 A1 | 10/2003 | Di Cesare |
| 2003/0195807 A1 | 10/2003 | Maggio |
| 2003/0208579 A1 | 11/2003 | Brady et al. |
| 2003/0211856 A1 | 11/2003 | Zilliacus |
| 2003/0212691 A1 | 11/2003 | Kuntala et al. |
| 2003/0216185 A1 | 11/2003 | Varley |
| 2003/0216857 A1 | 11/2003 | Feldman et al. |
| 2003/0228866 A1 | 12/2003 | Pezeshki |
| 2003/0233425 A1 | 12/2003 | Lyons et al. |
| 2004/0005919 A1 | 1/2004 | Walker et al. |
| 2004/0014524 A1 | 1/2004 | Pearlman |
| 2004/0015442 A1 | 1/2004 | Hmlinen |
| 2004/0022366 A1 | 2/2004 | Ferguson et al. |
| 2004/0025190 A1 | 2/2004 | McCalla |
| 2004/0056897 A1 | 3/2004 | Ueda |
| 2004/0060063 A1 | 3/2004 | Russ et al. |
| 2004/0073915 A1 | 4/2004 | Dureau |
| 2004/0088729 A1 | 5/2004 | Petrovic et al. |
| 2004/0093302 A1 | 5/2004 | Baker et al. |
| 2004/0152454 A1 | 5/2004 | Kauppinen |
| 2004/0107138 A1 | 6/2004 | Maggio |
| 2004/0117831 A1 | 6/2004 | Ellis et al. |
| 2004/0117839 A1 | 6/2004 | Watson et al. |
| 2004/0125877 A1 | 7/2004 | Chang |
| 2004/0128319 A1 | 7/2004 | Davis et al. |
| 2004/0139158 A1 | 7/2004 | Datta |
| 2004/0139482 A1 | 7/2004 | Hale |
| 2004/0148638 A1 | 7/2004 | Weisman et al. |
| 2004/0152517 A1 | 8/2004 | Hardisty |
| 2004/0152519 A1 | 8/2004 | Wang |
| 2004/0158855 A1 | 8/2004 | Gu et al. |
| 2004/0162124 A1 | 8/2004 | Barton |
| 2004/0166873 A1 | 8/2004 | Simic |
| 2004/0176162 A1 | 9/2004 | Rothschild |
| 2004/0178923 A1 | 9/2004 | Kuang |
| 2004/0183824 A1 | 9/2004 | Benson |
| 2004/0185881 A1 | 9/2004 | Lee |
| 2004/0190779 A1 | 9/2004 | Sarachik et al. |
| 2004/0198495 A1 | 10/2004 | Cisneros et al. |
| 2004/0201626 A1 | 10/2004 | Lavoie |
| 2004/0203667 A1 | 10/2004 | Schroder |
| 2004/0203898 A1 | 10/2004 | Bodin et al. |
| 2004/0210507 A1 | 10/2004 | Asher et al. |
| 2004/0215756 A1 | 10/2004 | VanAntwerp |
| 2004/0216161 A1 | 10/2004 | Barone, Jr. et al. |
| 2004/0216171 A1 | 10/2004 | Barone, Jr. et al. |
| 2004/0224750 A1 | 11/2004 | Al-Ziyoud |
| 2004/0242321 A1 | 12/2004 | Overton |
| 2004/0266513 A1 | 12/2004 | Odom |
| 2005/0003878 A1 * | 1/2005 | Updike ............ G06Q 50/34 463/16 |
| 2005/0005303 A1 | 1/2005 | Barone, Jr. et al. |
| 2005/0021942 A1 | 1/2005 | Diehl et al. |
| 2005/0026699 A1 | 2/2005 | Kinzer et al. |
| 2005/0028208 A1 | 2/2005 | Ellis |
| 2005/0043094 A1 | 2/2005 | Nguyen et al. |
| 2005/0076371 A1 | 4/2005 | Nakamura |
| 2005/0077997 A1 | 4/2005 | Landram |
| 2005/0060219 A1 | 5/2005 | Ditering et al. |
| 2005/0097599 A1 | 5/2005 | Potnick et al. |
| 2005/0101309 A1 | 5/2005 | Croome |
| 2005/0113164 A1 | 5/2005 | Buecheler et al. |
| 2005/0131984 A1 | 6/2005 | Hofmann et al. |
| 2005/0138668 A1 | 6/2005 | Gray et al. |
| 2005/0144102 A1 | 6/2005 | Johnson |
| 2005/0155083 A1 | 7/2005 | Oh |
| 2005/0177861 A1 | 8/2005 | Ma et al. |
| 2005/0210526 A1 | 9/2005 | Levy et al. |
| 2005/0216838 A1 | 9/2005 | Graham |
| 2005/0235043 A1 | 10/2005 | Teodosiu et al. |
| 2005/0239551 A1 | 10/2005 | Griswold |
| 2005/0255901 A1 | 11/2005 | Kreutzer |
| 2005/0256895 A1 | 11/2005 | Dussault |
| 2005/0266869 A1 | 12/2005 | Jung |
| 2005/0267969 A1 | 12/2005 | Poikselka et al. |
| 2005/0273804 A1 | 12/2005 | Preisman |
| 2005/0283800 A1 | 12/2005 | Ellis et al. |

(56) References Cited

U.S. PATENT DOCUMENTS

| | | |
|---|---|---|
| 2005/0288080 A1 | 12/2005 | Lockton et al. |
| 2005/0288101 A1 | 12/2005 | Lockton et al. |
| 2005/0288812 A1 | 12/2005 | Cheng |
| 2006/0020700 A1 | 1/2006 | Qiu |
| 2006/0025070 A1 | 2/2006 | Kim et al. |
| 2006/0046810 A1 | 3/2006 | Tabata |
| 2006/0047772 A1 | 3/2006 | Crutcher |
| 2006/0053390 A1 | 3/2006 | Gariepy-Viles |
| 2006/0058103 A1 | 3/2006 | Danieli |
| 2006/0059161 A1 | 3/2006 | Millett et al. |
| 2006/0063590 A1 | 3/2006 | Abassi et al. |
| 2006/0082068 A1 | 4/2006 | Patchen |
| 2006/0087585 A1 | 4/2006 | Seo |
| 2006/0089199 A1 | 4/2006 | Jordan et al. |
| 2006/0094409 A1 | 5/2006 | Inselberg |
| 2006/0101492 A1 | 5/2006 | Lowcock |
| 2006/0111168 A1 | 5/2006 | Nguyen |
| 2006/0135253 A1 | 6/2006 | George et al. |
| 2006/0148569 A1 | 7/2006 | Beck |
| 2006/0156371 A1 | 7/2006 | Maetz et al. |
| 2006/0160597 A1 | 7/2006 | Wright |
| 2006/0174307 A1 | 8/2006 | Hwang et al. |
| 2006/0183547 A1* | 8/2006 | McMonigle ............ G07F 17/32 463/40 |
| 2006/0183548 A1 | 8/2006 | Morris et al. |
| 2006/0190654 A1 | 8/2006 | Joy |
| 2006/0205483 A1 | 9/2006 | Meyer et al. |
| 2006/0205509 A1 | 9/2006 | Hirota |
| 2006/0205510 A1 | 9/2006 | Lauper |
| 2006/0217198 A1 | 9/2006 | Johnson |
| 2006/0236352 A1 | 10/2006 | Scott, III |
| 2006/0248553 A1 | 11/2006 | Mikkelson et al. |
| 2006/0248564 A1 | 11/2006 | Zinevitch |
| 2006/0256865 A1 | 11/2006 | Westerman |
| 2006/0256868 A1 | 11/2006 | Westerman |
| 2006/0269120 A1 | 11/2006 | Nehmadi et al. |
| 2006/0285586 A1 | 12/2006 | Westerman |
| 2007/0004516 A1 | 1/2007 | Jordan et al. |
| 2007/0013547 A1 | 1/2007 | Boaz |
| 2007/0019826 A1 | 1/2007 | Horbach et al. |
| 2007/0028272 A1 | 2/2007 | Lockton |
| 2007/0037623 A1 | 2/2007 | Romik |
| 2007/0054695 A1 | 3/2007 | Huske et al. |
| 2007/0078009 A1 | 4/2007 | Lockton et al. |
| 2007/0083920 A1 | 4/2007 | Mizoguchi et al. |
| 2007/0086465 A1 | 4/2007 | Paila et al. |
| 2007/0087832 A1 | 4/2007 | Abbott |
| 2007/0093296 A1 | 4/2007 | Asher |
| 2007/0101358 A1 | 5/2007 | Ambady |
| 2007/0106721 A1 | 5/2007 | Schloter |
| 2007/0107010 A1 | 5/2007 | Jolna et al. |
| 2007/0129144 A1 | 6/2007 | Katz |
| 2007/0147870 A1 | 7/2007 | Nagashima et al. |
| 2007/0162328 A1 | 7/2007 | Reich |
| 2007/0183744 A1 | 8/2007 | Koizumi |
| 2007/0197247 A1 | 8/2007 | Inselberg |
| 2007/0210908 A1 | 9/2007 | Putterman et al. |
| 2007/0219856 A1 | 9/2007 | Ahmad-Taylor |
| 2007/0222652 A1 | 9/2007 | Cattone et al. |
| 2007/0226062 A1 | 9/2007 | Hughes et al. |
| 2007/0238525 A1 | 10/2007 | Suomela |
| 2007/0243936 A1 | 10/2007 | Binenstock et al. |
| 2007/0244570 A1 | 10/2007 | Speiser et al. |
| 2007/0244585 A1 | 10/2007 | Speiser et al. |
| 2007/0244749 A1 | 10/2007 | Speiser et al. |
| 2007/0265089 A1 | 11/2007 | Robarts |
| 2007/0294410 A1 | 12/2007 | Pandya |
| 2008/0005037 A1 | 1/2008 | Hammad |
| 2008/0013927 A1 | 1/2008 | Kelly et al. |
| 2008/0051201 A1 | 2/2008 | Lore |
| 2008/0066129 A1 | 3/2008 | Katcher et al. |
| 2008/0076497 A1 | 3/2008 | Kiskis et al. |
| 2008/0104630 A1 | 5/2008 | Bruce |
| 2008/0146337 A1 | 6/2008 | Halonen |
| 2008/0169605 A1 | 7/2008 | Shuster et al. |
| 2008/0222672 A1 | 9/2008 | Piesing |
| 2008/0240681 A1 | 10/2008 | Fukushima |
| 2008/0248865 A1 | 10/2008 | Tedesco |
| 2008/0270288 A1 | 10/2008 | Butterly et al. |
| 2008/0288600 A1 | 11/2008 | Clark |
| 2009/0011781 A1 | 1/2009 | Merrill et al. |
| 2009/0094632 A1 | 4/2009 | Newnam et al. |
| 2009/0103892 A1 | 4/2009 | Hirayama |
| 2009/0186676 A1 | 7/2009 | Amaitis et al. |
| 2009/0163271 A1 | 9/2009 | George et al. |
| 2009/0228351 A1 | 9/2009 | Rijsenbrij |
| 2009/0234674 A1 | 9/2009 | Wurster |
| 2009/0264188 A1* | 10/2009 | Soukup .................... G07F 17/32 463/25 |
| 2009/0271512 A1 | 10/2009 | Jorgensen |
| 2009/0325716 A1 | 12/2009 | Harari |
| 2010/0099421 A1 | 4/2010 | Patel et al. |
| 2010/0099471 A1 | 4/2010 | Feeney et al. |
| 2010/0107194 A1 | 4/2010 | McKissick et al. |
| 2010/0120503 A1 | 5/2010 | Hoffman et al. |
| 2010/0137057 A1 | 6/2010 | Fleming |
| 2010/0203936 A1 | 8/2010 | Levy |
| 2010/0279764 A1 | 11/2010 | Allen et al. |
| 2010/0296511 A1 | 11/2010 | Prodan |
| 2011/0016224 A1 | 1/2011 | Riley |
| 2011/0053681 A1 | 3/2011 | Goldman |
| 2011/0065490 A1 | 3/2011 | Lutnick |
| 2011/0081958 A1 | 4/2011 | Herrmann |
| 2011/0116461 A1 | 5/2011 | Holt |
| 2011/0130197 A1 | 6/2011 | Bythar et al. |
| 2011/0227287 A1 | 9/2011 | Reabe |
| 2011/0269548 A1 | 11/2011 | Barclay et al. |
| 2012/0115585 A1 | 5/2012 | Goldman |
| 2012/0157178 A1* | 6/2012 | Lockton ............ H04N 21/6131 463/9 |
| 2012/0264496 A1 | 10/2012 | Behrman et al. |
| 2012/0282995 A1 | 11/2012 | Allen et al. |
| 2013/0005453 A1 | 1/2013 | Nguyen et al. |
| 2013/0029765 A1* | 1/2013 | Parks .................... G07F 17/3225 463/42 |
| 2014/0100011 A1 | 4/2014 | Gingher |
| 2014/0128139 A1 | 5/2014 | Shuster et al. |
| 2014/0279439 A1 | 9/2014 | Brown |
| 2014/0309001 A1 | 10/2014 | Root |
| 2014/0378212 A1 | 12/2014 | Sims |
| 2015/0024814 A1 | 1/2015 | Root |
| 2015/0067732 A1 | 3/2015 | Howe et al. |
| 2015/0238873 A1 | 8/2015 | Arnone et al. |
| 2015/0356831 A1 | 12/2015 | Osibodu |
| 2016/0023116 A1* | 1/2016 | Wire ........................ A63F 13/71 463/16 |
| 2016/0217653 A1* | 7/2016 | Beyer .................. G07F 17/3227 |
| 2016/0271501 A1 | 9/2016 | Balsbaugh |
| 2017/0098348 A1 | 4/2017 | Odom |
| 2017/0103615 A1 | 4/2017 | Theodospoulos |
| 2017/0128840 A1 | 5/2017 | Croci |
| 2017/0243438 A1 | 8/2017 | Merati |
| 2017/0249801 A1 | 8/2017 | Malek |
| 2017/0266564 A1* | 9/2017 | Choudhuri ............ A63F 13/335 |
| 2017/0345260 A1 | 11/2017 | Strause |
| 2018/0071637 A1 | 3/2018 | Baazov |
| 2018/0190077 A1 | 7/2018 | Hall |
| 2019/0143225 A1 | 5/2019 | Baazov |

FOREIGN PATENT DOCUMENTS

| | | |
|---|---|---|
| CA | 2279069 | 7/1999 |
| CA | 2287617 | 10/1999 |
| EP | 0649102 A3 | 6/1996 |
| GB | 2364485 | 1/2002 |
| JP | 11-46356 | 2/1999 |
| JP | 11-239183 | 8/1999 |
| JP | 2000-165840 | 6/2000 |
| JP | 2000-217094 | 8/2000 |
| JP | 2000-358255 | 12/2000 |
| JP | 2001-28743 | 1/2001 |
| JP | 2000-209563 | 7/2008 |
| NZ | 330242 | 10/1989 |

(56) References Cited

FOREIGN PATENT DOCUMENTS

| WO | 01/039506 A2 | 5/2001 |
|----|--------------|--------|
| WO | 01/65743 A1 | 9/2001 |
| WO | 02/03698 A1 | 10/2002 |
| WO | 2005064506 A1 | 7/2005 |
| WO | 2006004855 A2 | 1/2006 |
| WO | 2006004856 A2 | 1/2006 |
| WO | 2007002284 A2 | 1/2007 |
| WO | 2007016575 A2 | 2/2007 |
| WO | 2007041667 A2 | 4/2007 |
| WO | 2008027811 A2 | 3/2008 |
| WO | 2008115858 A1 | 9/2008 |

OTHER PUBLICATIONS

Two Way TV Patent and Filing Map www.twowaytv.com/version4/technologies/tech_patents.asp.

'Ark 4.0 Standard Edition, Technical Overview ' www.twowaytv.com/version4/technologies/tech_ark_professionals.asp.

"Understanding the Interactivity Between Television and Mobile commerce", Robert Davis and David Yung, Communications of the ACM, Jul. 2005, vol. 48, No. 7, pp. 103-105.

"Re: Multicast Based Voting System" www.ripe.net/ripe/maillists/archives/mbone-eu-op/1997/msg00100html.

"IST and Sportal.com: Live on the Internet Sep. 14, 2004 by Clare Spoonheim", www.isk.co.usk/NEWS/dotcom/ist_sportal.html.

"Modeling User Behavior in Networked Games byTristan Henderson and Saleem Bhatti", www.woodworm.cs.uml.edu/rprice/ep/henderson.

"SMS Based Voting and Survey System for Meetings", www.abbit.be/technology/SMSSURVEY.html.

"PurpleAce Launches 3GSM Ringtone Competition", www.wirelessdevnet.com/news/2005/jan/31/news6html.

"On the Perfomance of Protocols for collecting Responses over a Multiple-Access Channel", Mostafa H. Ammar and George N. Rouskas, IEEE Incomform '91, pp. 1490-1499, vol. 3, IEEE, New York, NY.

Merriam-Webster, "Game" definition, <http://www.merriam-webster.com/dictionary/agme.pg.1.

Ducheneaut et al., "The Social Side of Gaming: A Study of Interaction Patterns in a Massively Multiplayer Online Game", Palo Alto Research Center, Nov. 2004, vol. 6, Issue 4, pp. 360-369. http://help.yahoo.com/help/us/tourn/tourn-03.html.

Pinnacle, "The basics of reverse line movement," Jan. 19, 2018, Retrieved on Jan. 22, 2020 , http://www.pinnacle.com/en/betting-articles educational/basics-of-reverse-line-movement/QAH26XGGQQS7M3GD.

GAMBLING Commission, "Virtual currencies, eSports and social casino gaming-position paper," Mar. 2017, Retrieved on Jan. 22, 2020, http://gamblingcomission.gov.uk/PDF/Virtual-currencies-eSports-and-social-casino-gaming.pdf.

Sipko et al., "Machine learning for the prediction of professional tennis matches," In: MEng computing-final year project, Imperial College London, Jun. 15, 2015, http://www.doc.ic.ac.uk/teaching/distinguished-projects/2015/m.sipko.pdf.

Winview Game Producer, "Live TV Sports Play Along App WinView Games Announces Sponsorship With PepsiCo to Start This Holiday Season," In Winview Games. Dec. 21, 2016, Retrieved on Jan. 21, 2020 from , http://www.winviewgames./press-release/live-tv-sports-play-along-app-winview-games-announces-sponsorship-pepsico-start-holiday-season/.

International Search Report and the Written Opinion for the PCT/US2019/054859 dated Feb. 4, 2020.

International Preliminary Report dated Apr. 22, 2021 for the application PCT/US2019/054859.

\* cited by examiner

METHOD OF GENERATING SEPARATE CONTESTS OF SKILL OR CHANCE FROM TWO INDEPENDENT EVENTS

RELATED APPLICATION(S)

This Patent Application claims priority under 35 U.S.C. § 119(e) of the co-pending, co-owned U.S. Provisional Patent Application No. 62/364,768, filed Jul. 20, 2016, and entitled "A METHOD OF GENERATING SEPARATE CONTESTS OF SKILL OR CHANCE FROM TWO INDEPENDENT EVENTS" which is also hereby incorporated by reference in its entirety.

FIELD OF THE INVENTION

The present invention relates to methods and systems for implementing a separate and combined contest for participants competing both in a daily fantasy event and a separate contest played in real-time on a web-connected device while viewing a live sporting event or other events.

BACKGROUND

According to Wikipedia and the International Telecommunication Union, roughly 3 billion people are or will be online (e.g., have access to the Internet), and the number continues to grow. In North America, there are 57 million participating in Fantasy Leagues with over 8 million participating in Daily Fantasy Leagues. In Europe, over 65 million using mobile or other internet connected devices place wagers in real-time directly related to a telecast of a sporting event. Therefore, hundreds of millions of people could be involved in contests of skill or chance at the same time. The complex computer systems support Daily Fantasy competition and those that control real-time contests which begin the very instant when Daily Fantasy competitions are closed are incompatible and operated by unrelated companies. The system handling the contests of skill or chance must be able to process such a computational and data load. A major computer-based, technical problem is efficiently handling large amounts of network data from potentially millions of participants. Many companies do not have a solution to this problem, and either limit competitions to a smaller number of competitors or the competitions suffer from technical issues such as network congestion which causes the gameplay to suffer.

SUMMARY OF THE INVENTION

The daily fantasy sports industry has rapidly grown in the last 5 years to evolve to over 8 million participants. These contests are based upon the skill in the drafting of teams of players based on prescribed limitations. The winners of these daily fantasy contests are those participants whose drafts selections score the highest number of total points. Since the winners are determined by the statistics and generated by the drafted players in actual games to be played, these contests cease to accept new entries concurrent with the start of the first event which is counted in scoring of the daily fantasy competition. Thus, in daily fantasy baseball, a contest based upon the results of games played on a Sunday; all entries are locked in after the first pitch in the first game of the day. Already millions of players are checking injury reports and weather conditions at the last minute then entering their drafts before all are simultaneously locked out. Almost all of these entrants then watch one or more of the games televised where the statistics originate, which will determine the winners of their fantasy contests.

Companies such as WinView offer games of skill which appeal to the very same target market, and these conducted contests begin when the fantasy game entries are locked in with the first televised/streamed game and are conducted live in real-time (sometimes utilizing two screens). The competition is based on the competitors observing the television broadcast and interacting on a separate interactive device. Daily fantasy contests and the real-time games are both scored by the unfolding game data. Both of these contests test the knowledge, skill, research and decision making capabilities of the participants and appeal to exactly the same audience. Each is scored by very different systems and software based on unrelated sets of statistics however, and the winners of each contest are determined by a different application of skill, knowledge, tactics, game play, and basic knowledge of the teams and participants The methods and systems described herein enable the creation and management of a completely separate unique and free standing contest utilizing unrelated and unconnected systems each processing potentially tens of millions of separate contest entries which are based on the combined performance among the entrants in two separate and different genres of events, a daily fantasy league competition and "In Play" competition played in real-time with the unfolding telecast. In the business of legalized sports betting, this kind of entry of independent and separate events in a single prize pool is called a parlay.

A solution to the problem of large amounts of network data involves utilizing multiple servers which are able to be positioned appropriately to serve users based on geographic proximity. Another solution is to utilize distributed computing such as enabling the end user devices to process results and scoring. Similarly, ensuring fair gameplay for millions of competitors is also addressed by determining and responding to any delays in receipt of content such as by the use of lockout signals.

DETAILED DESCRIPTION

The systems and methods to generate and manage a separate contest based on two independent and unconnected systems utilize a cooperating fantasy league operator/provider and either a related or separate real-time contest provider. In some embodiments, the separate contests are generated and managed using related or connected systems. Each game provider generates a data management system to accept entries and cash deposits from players who wish to enter a parlay-type separate contest where winners are determined by combining the performance in a specified daily fantasy league competition and a separate pre-specified performance in a real-time competition. Entries in the combined event can be accepted by either of the two separate contest management systems. At any time before the first sporting event counted as part of the daily fantasy event begins, a participant is able to elect to enter the combined event and pay a separate entry fee in a manner similar to the method utilized by daily fantasy leagues for administrating separate contests for a specified event, for example a "50/50" contest, or a "winner takes all" group. The separate game management systems (e.g., the daily fantasy league provider and the real-time provider) communicate with another game server that an entry fee deducted from one or both accounts has occurred and an entry was made in the combined (parlay) separate event.

A separate data management system manages only the combined performance of those players who have entered the combined contest system and are ranked from top to bottom from the results of the completed designated daily fantasy league play. In this case, someone who finished $5^{th}$, for example, in the open daily fantasy league contest played concurrently might finish first among just those who have entered the separate parlay contest.

While the results of the daily fantasy league entry in the combined contest are not determined until the completion of the last game of the combined games specified for scoring, the daily fantasy league contest are completed, the real-time two screen event is selected and specifically designated for the parlay contest could be based on, for example, a single quarter of a Monday night football game, an average of all quarters from a Monday night football game, or any combination of future events conducted by the two screen real-time provider specified in advance by the combined competition organizers to constitute the second part of the two contest competition.

Although a two-screen event is described herein, single screen events are able to be implemented as well, such as streaming content (e.g., a baseball game) with game data (e.g., real-time questions related to the content) where the streamed content and game data are displayed on a single device. It is understood that any references to "two screen" are able to be implemented with a single screen or any other implementation. The common element is a game played live while viewing an event via television/streaming received and displayed in any manner, with the game play data delivered via an Internet connection. The event telecast/stream and game data is able to be delivered and displayed separately or in a combined communications path on a single user interface.

At the conclusion of the predesigned live two screen event, which may be the second part for the combined contest, the system again scores only those entrants in the parlay contest, and then performances are ranked from top to bottom. In each case, a percentile standing is then assigned to each participant in each contest, for example. The winner of the daily fantasy segment contest will receive an assigned score of 100%, second place 99.9% and so on. This final result database will be compiled for these fantasy participants and sent to a server managing and administrating the combined contest. The same process will be repeated at the close of the events constituting the two-screen side of the combined parlay contest, with only those entered who have paid an entry fee to the combined contest, with scores being ranked from top to bottom and also assigned a separate percentile standing. The two screen (real-time) aspect of the contest may also be based on an average of the performance in multiple contests, for example, the average of the finish in four quarters of a football game.

The two separate percentile standings are then averaged to generate a combined score for the combined or parlay contest. Therefore, if individual "A" achieved an 89.6 percentile in the daily fantasy section of a combined contest in a 92.4 percentile standing in the two screen real-time contest, the score for the combined contest would be 91.0. All combined scores are ranked from highest to lowest (or vice versa), and the parlay prize pool distribution would be made based upon the average scores of the two separate and individual contests paid. Scoring is able to be implemented in other ways such as providing weighted scores (e.g., the real-time contest is weighted higher than the daily fantasy contest) and/or any other scoring implementations.

As it must be determined and verified that the scores achieved in the two contests are by the same individual, the combined contest server compares the cell phone numbers and other account registration information required to be supplied to the daily fantasy operator with the similar information separately collected by the two screen real-time game provider to verify that the scores were generated by the identical entrant and the entry fees (if required) received by each operator.

There are many variations of this approach. For example, an MLB or NFL season or a selected portion of a season on the fantasy league side could be designated as part of the combined event with a similar long-term series of events designated as two screen real-time event. Again, although the real-time competition is described as two screen, it is possible for the competition to be implemented using fewer or more screens (e.g., one screen with two windows or one screen with embedded information or three screens). The screens are able to be on the same device (e.g., mobile device receiving a streamed broadcast or web-connected "smart" television) or different devices (e.g., a television is the first screen and a mobile device is the second screen).

Figure 1:
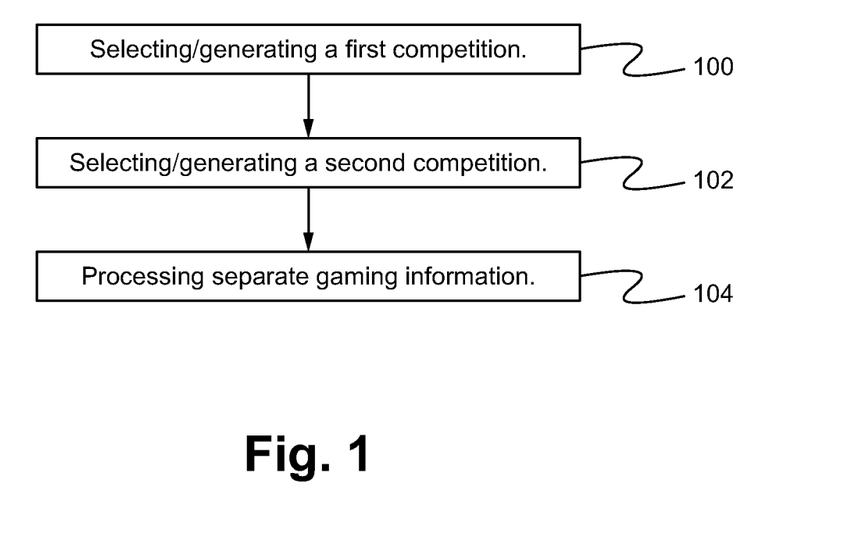
FIG. 1 illustrates a flowchart of a method of generating multiple contests of skill or chance from two independent events according to some embodiments.

FIG. 1 illustrates a flowchart of a method of generating multiple contests of skill or chance from two independent events according to some embodiments. In the step 100, a user selects/generates a first competition. For example, the user joins a daily fantasy competition. More specifically, the user joins a competition where they select players to participate in fantasy football for that Sunday. In another example, the user is a game operator who generates daily fantasy competitions for other users to join. In some embodiments, any of the rules or variations of rules apply to selecting the first competition. For example, the user is able to draft/select players in a variety of ways and/or make other selections to generate a fantasy team to compete to earn the most points for a designated contest period (e.g., single day, week, season). In the step 102, the user selects/generates a second competition. For example, the user joins a real-time competition. More specifically, the user joins a real-time competition involving one or more of the Sunday football games related to the fantasy football. In another example, the user is a game operator who generates real-time competitions for other users to join. In addition to selecting the competition, participating in/operating the competition also occurs. For example, the user predicts the outcome of the next event (e.g., run, pass, first down, and others), whether a team will score, and/or any other options in real-time before the play occurs. In addition to generating the separate competitions, the game operator enables entry into both competitions (e.g., daily fantasy and real-time). In the step 104, one or more servers process the separate selections/gaming information (e.g., the daily fantasy information and the real-time game play). The servers are able to be dedicated servers for each task such as a daily fantasy server for processing the daily fantasy information and a real-time server for processing the real-time game information. A third server might be utilized to process the competition based on the combined performance. The servers communicate with each other as well to confirm that the payments and/or selections have been made. Processing the gaming information includes generating scores for the participants and/or ranking the participants of the competitions, including combining the scores and/or combining the rankings of each participant to generate a combined score/ranking. In some embodiments, the first competition and the second competition are related. For example, the first competition involves daily fantasy picks related to a first set of games, and the second competition involves real-time picks related to at least one game of the first set of games. In some embodiments, the first competition and the second competition involve at least some overlap in time (e.g., while the first competition is ongoing, the second competition takes place). Processing the gameplay also includes determining and generating results, depending on the game. For example, as described herein, users receive scores based on their selections for the daily fantasy competition and/or the real-time competition. The scores are able to be used to generate rankings in the competitions. The scores and/or rankings of the separate competitions are then used to determine a combined score and/or ranking for those participants of the multiple competitions (e.g., daily fantasy and real-time). In some embodiments, fewer or additional steps are implemented. In some embodiments, the order of the steps is modified. In some embodiments, the results of the two separate competitions are computed in real-time while the underlying events are underway. The combined standings are computed in real-time and displayed only to those who have entered the separate combined competition.

Figure 2:
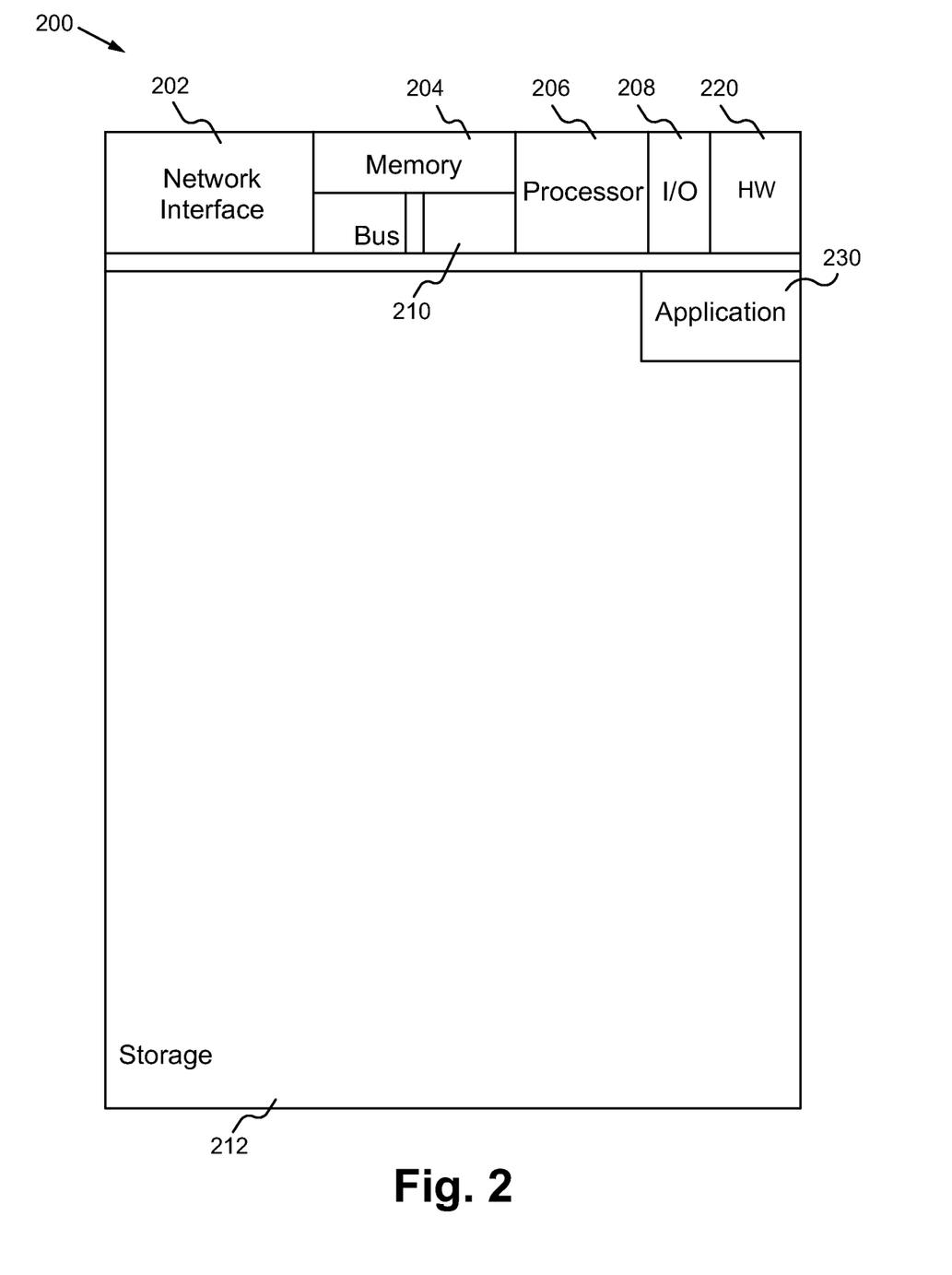
FIG. 2 illustrates a block diagram of an exemplary computing device configured for implementing the method of generating multiple contests of skill or chance from two independent events according to some embodiments.

FIG. 2 illustrates a block diagram of an exemplary computing device configured for implementing the method of generating multiple contests of skill or chance from two independent events according to some embodiments. The computing device 200 is able to be used to acquire, store, compute, process, communicate and/or display information. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, High Definition disc/drive, ultra-HD drive, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, screen, printer, modem, touchscreen, button interface and other devices. Multiple contest application(s) 230 used to perform the method of generating multiple contests are likely to be stored in the storage device 212 and memory 204 and processed as applications are typically processed. More or fewer components shown in FIG. 2 are able to be included in the computing device 200. In some embodiments, multiple contest hardware 220 is included. Although the computing device 200 in FIG. 2 includes applications 230 and hardware 220 for the method of generating multiple contests, the method of generating multiple contests is able to be implemented on a computing device in hardware, firmware, software or any combination thereof. For example, in some embodiments, the multiple contest applications 230 are programmed in a memory and executed using a processor. In another example, in some embodiments, the multiple contest hardware 220 is programmed hardware logic including gates specifically designed to implement the method of generating multiple contests.

In some embodiments, the multiple contest application(s) 230 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high-definition disc writer/player), a television, a home entertainment system, an augmented reality device, a virtual reality device, smart jewelry (e.g., smart watch) or any other suitable computing device.

Figure 3:
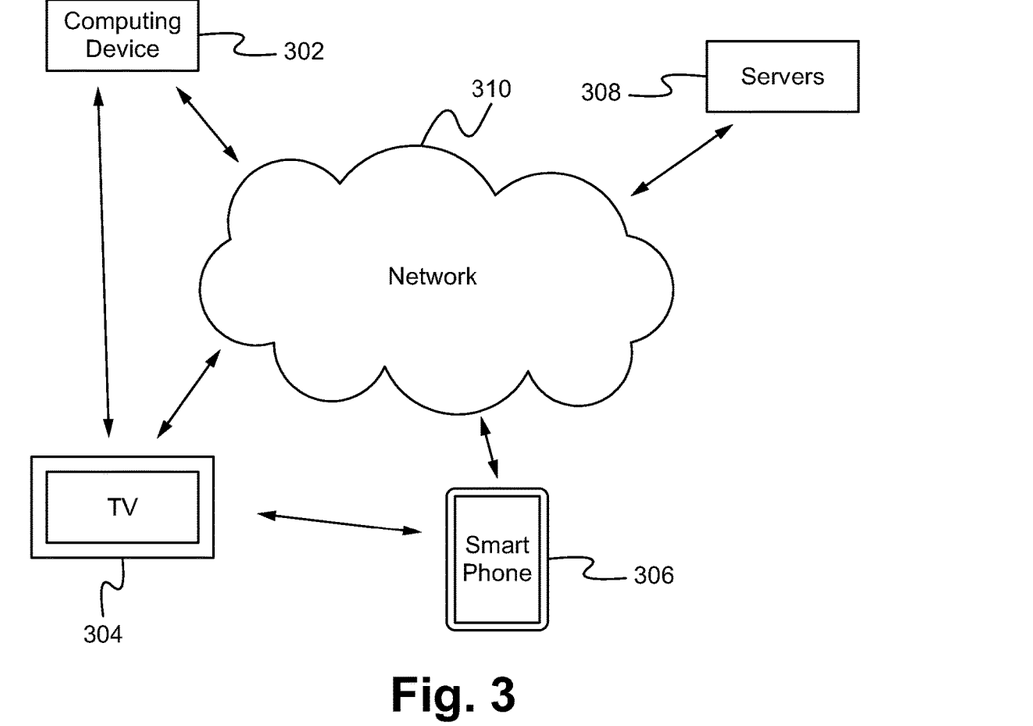
FIG. 3 illustrates a network of devices for implementing the method of generating multiple contests of skill or chance from two independent events according to some embodiments.

FIG. 3 illustrates a network of devices for implementing the method of generating multiple contests of skill or chance from two independent events according to some embodiments. The network of devices 300 is able to include any number of devices. For example, the network of devices 300 includes a computing device 302, a television 304, a smart phone 306, one or more servers 308 and a network 310. The devices are able to communicate through a network 310 such as the Internet or directly to each other. A user is able to use the computing device 302, the television 304, the smart phone 306 and/or another device to perform tasks such as joining the competitions, providing selections for the competitions, watching the events and/or any other tasks. The information provided by the user is sent to the one or more servers 308. Additionally, the one or more servers 308 communicate to retrieve and process gaming/event information (e.g., number of touchdowns scored by Football Player X). For example, the one or more servers 308 include: a daily fantasy league server which provides/processes data (e.g., statistics, user interface, results) regarding the daily fantasy contest; a real-time server which provides/processes data (e.g., real-time questions/submissions via a user interface, results) regarding the real-time contest, and the real-time server communicates with a game server to determine if the correct entry fee(s) have been paid and/or selections have been made; and a data management server which manages the combined performance of the players who have entered the combined contest system. Furthering the example, there is a dedicated server for daily fantasy competitions, a separate, dedicated server for real-time competitions and another separate, dedicated server for handling data for users who have selected to participate in both competitions. In some embodiments, instead of the third dedicated server acting separately, the third dedicated server uses shared information from the daily fantasy server and the real-time server. In some embodiments, the real-time server is configured specifically to be able to process data in real-time (e.g., utilizing a real-time operating system or an operating system capable of implementing real-time threads), whereas the daily fantasy league server and/or the combined competition server may be implemented without real-time capabilities.

In some embodiments, the devices and/or servers are optimized to implement the separate contests of skill for multiple events. For example, data that is accessed more frequently is stored on faster access storage (e.g., RAM as opposed to slower storage devices). Furthering the example, the data relevant for the current week is stored on faster access storage, and data from past weeks is stored on slower storage devices. In another example, when a user selects a competition/contest, information related to that competition/contest is moved to local storage for faster access.

For the real-time competition, latency issues could possibly give some users an unfair advantage. The latency issues are solved through a system and method to effectively equalize systemic propagation delay variances to a required level dictated by the demands and rules of a particular game, so that a material competitive advantage is not obtained, and the user experience is optimized for all players.

The solution includes first determining how each viewer is receiving their television signal (e.g. via an over the air broadcast in a metropolitan area, via a particular cable system or a particular satellite system, via streaming). All subscribers to a particular service provider or who are receiving an over the air broadcast in a specific metropolitan area will receive the signal at their location at the same time. It is also able to be determined if there is further processing of the signal within the homes, office, bar and others, which could further increase the total length of the propagation delay. Examples would be the use of a DVR, such as TiVo™. A variety of methodologies are able to be utilized to determine the time difference between the reception of the television picture being utilized by the central game production facility where "lock out" signals are generated and each separate group of viewers around the country or around the world.

One approach is to survey the delays encountered through the various delivery systems such as cable, over the air or satellite in various geographic areas and adjust the synchronization of the game control information for all players to optimize the game play experience while defeating cheating enabled by receiving late lock outs to questions.

In another approach, the total viewing population for a telecast is divided into segments or blocks of viewers referred to as "cohorts." For example, the 2 million inhabitants of the San Francisco Bay Area would be divided into approximately 1 over the air broadcast, 3 satellite independent providers and several cable "head ends" or central broadcast points serving a "cohort." This information would be gathered at a central game server, and all players registered to play in a particular contest would be assigned to a specific cohort of viewers.

The following are some other methodologies for determining the delays experienced by various cohorts who are able to be used in combination or separately.

In one methodology, upon joining the service and prior to initial game play, subscribers and competitors are required to identify the method by which they receive their television signal and identify the cable or satellite service provider and answer questions relative to whether or not they subscribe to an analog or digital high definition service or utilize a DVR. This information is able to be verified by sending questions to their cellular phones concerning commercials, station breaks and the precise time they are viewed or utilizing other information only seen by members of that cohort.

In another methodology, a routine is established upon first entry into a game where the individual viewer is asked to mark the precise time a predetermined audio or visual event in the television program occurs, such as the initial kickoff, which would establish the deviation of their receipt of their television picture from the television signal utilized by the game producers. While some viewers might attempt to cheat by delaying their input, the earliest entries from the cohorts in this group would be averaged to establish the accurate delta between the receipt of the telecast/stream by the production crew and those in each discrete sub-group of viewers.

In another methodology, the GPS function in the cellular phone is used to determine the physical location of a viewer which is matched to a database of cable lead ends or over the air broadcast stations available to a consumer in that precise location.

In another methodology, employees of the game producer who are members of the subgroups which constitute the competitors/viewers, e.g. a subscriber to Comcast Cable in San Francisco, are utilized by the game service provider. These individuals would provide the current propagation delay information sent to the game server utilizing their identification of a recognizable event they observe on their television set, such as the initial snap of the ball.

In another methodology, audio or video artifacts or information done in cooperation with the television signal provider are inserted which must be immediately responded to by the competitor to verify the source of their television signal or monitored at cooperative viewers' television sets.

In another methodology, the various delays through an automated system linked to the game server, which continuously samples the audio or video track of the underlying satellite, cable or over the air broadcast television signals are established around the country to provide the information of the precise arrival of the underlying television picture.

Utilizing software resident in the game control server, game control data for each set of viewers/competitors of the game in progress who are receiving their television picture or streaming content through the same source are batched together by the game control server, and the appropriate delay is either time stamped on the game "lock out" signals, or is imposed on the entire data stream so that competitors receiving their content slightly behind or ahead of others gain no material competitive advantage. Another method is for the game control server to send all the game control data to all of the viewers/competitors of the game at the same time, and the client software is able to delay the presentation of the game data based on the viewers' cohort.

Utilizing these methodologies to measure the delays in each cohort, each cohort of viewers would have artificial time delays on the game control information imposed by the game control server, which would substantially equalize the receipt of "lock out" data relative to the event triggering the "lock out," based on the underlying television programming, for example, the snap of the football. Players receiving the television signals or streaming content in advance of the one with the slowest receipt of the television signal or streaming content would receive "lock out" signals slightly delayed or time stamped with a slightly later time as described in U.S. Pat. No. 4,592,546. By providing a correspondingly delayed lock out to a viewer receiving their signal later, a potential advantage is mitigated.

Alternatively, this time equalization from cohort to cohort could, for example, involve artificially delaying the transmission of the game control data stream sent to all competitors' cell phones or other mobile devices by the appropriate amount of seconds, to sufficiently minimize the advantage a player with a few more seconds of television-based (or streaming-based) information would have. For example, by time stamping the "lock out" signal at an earlier event, such as when the team breaks from the huddle, the chance of some cohorts seeing the actual beginning of the play is eliminated and the discrepancy in propagation delay provides little or no advantage.

In some embodiments, a method of and system for conducting multiple competitions of skill for a single performance are described herein. User-generated competition groups and system-generated competition groups allow users to participate in multiple competitions at once based on answering the same questions or making the same selections related to a single event or multiple events. The users are informed of the availability of each competition either via email, text message or when logging into the network via a website. The users select which competitions groups to join. After joining the desired groups, the users then make their selections related to the event which are transmitted to the network where results are tabulated and transmitted back to the users. The results are separated for each competition group, so that users continually know where they stand in each separate competition. With multiple competition groups, users are able to have varying success from the same performance in multiple competitions.

When used in conjunction with the methods and systems described herein, a user is able to participate in multiple competitions simultaneously. For example, instead of the user participating in a single daily fantasy competition and/or a single real-time competition, the user is able to participate in multiple daily fantasy competitions and/or multiple real-time competitions based on a single performance. Furthering the example, the user joins multiple daily fantasy competitions which all use a single set of selections (e.g., Andrew Luck as QB, Murray as RB, Beckham Jr. as WR and so on). Instead of having to select the QB for each competition, the same set of selections is used for multiple competitions. Similarly, a user is able to associate a real-time performance with multiple competitions. In one example, the user joins three real-time competitions based on the 49ers vs. Eagles game (one competition is a friendly competition, a second competition is for $5 against a group of 10 players, and a third competition is for $1000 against a group of 100 players). In another example, the real-time competition selections and results are able to be applied to multiple combined results. For example, instead of a basic 1-to-1 selection of one daily fantasy football team and one real-time competition which results in one combined result, the user selects a daily fantasy football team applied to three separate competitions (e.g., friendly, group of 10 and group of 100), and the user selects three real-time competitions (e.g., selecting Run/Pass/more for 49ers vs. Eagles, Patriots vs. Bills, Broncos vs. Raiders) to be combined with the daily fantasy competitions for a total of nine separate competitions/results. Furthering the example, the result of the user's performance (of selecting, Run/Pass/Fumble/Interception and other real-time selections for the 49ers vs. Eagles is combined separately with the friendly competition, the group of 10 competition and the group of 100 competition, giving the user a first set of 3 opportunities to win. Additionally, the user's real-time performance for the Patriots vs. Bills is also combined with the friendly competition, the group of 10 competition and the group of 100 competition, giving the user a second set of 3 opportunities to win. Finally, the user's real-time performance for the Broncos vs. the Raiders is also combined with the friendly competition, the group of 10 competition and the group of 100 competition, giving the user a third set of 3 opportunities to win, which results in a total of 9 opportunities to win but only providing one set of selections for the daily fantasy competition and one set of selections (e.g., Run/Pass/more) for each of the three real-time competitions.

Although the method and system have been described in reference to real-time games of skill and chance, the method and system are able to be utilized with any event such as card games, dice games, trivia games, esports (e.g., video game competitions), television competitions (e.g., reality shows, quiz shows) and/or any other games/competitions/events.

In some embodiments, the competitions and/or any other aspects described herein are implemented using object oriented programming such as classes. For example, a real-time class is generated, and a daily fantasy competition is generated. Each of the classes is able to have specific data field descriptions/attributes such as questions, answers, scores, and participants. The objects are able to represent real world aspects in a non-abstract form.

In some embodiments, in addition to or instead of receiving video content (e.g., a television broadcast), a user device receives statistical information (e.g., live sports data feeds from a source such as Stats.com). For example, the statistical information is received on the user device which updates text and/or graphical information such as the number of runs, hits, outs, strikes/balls, and so on for each baseball team. The user device receiving the statistical information is able to be the same device or a different device than the one for participating in the game of skill or chance.

In some implementations, the statistical information may be received before the video content (e.g., the statistical information is received at a user device within 1 second from when it actually occurs live, and the video content is received at the user device in 7 seconds from when it occurred live). In some embodiments, the difference in receipt time is computed (similar to the calculation of other delays described herein) to account for such a difference. For example, if the difference between video receipt and statistical information receipt is 6 seconds (7 seconds−1 second), then a system (e.g., server, other network device, user device or a combination thereof) is able to delay transmission and/or display of the statistical information. For example, the game server receives the statistical information and then holds the statistical information for 6 seconds before passing the statistical information on to the user device so that the statistical information and the video content arrive at the same time (or approximately the same time). In another example, the user device receives the statistical information in 1 second, but then the user device (e.g., the game application) holds the statistical information and does not display the statistical information until another 6 seconds have passed so that the video content and statistical information are displayed at the same time (or approximately the same time). In some embodiments, the statistical information is delayed to be displayed before or after the video content. For example, in some implementations, the statistical information is not updated and displayed until 2 seconds after the video content is displayed. In some embodiments, the delay amount of the statistical information is static, and in some embodiments, the delay amount is dynamic. For example, a producer is able to adjust the delay amount based on analyzing the video propagation delays. The delay amount is able to be different depending on varying factors such as how the video content is received (e.g., cable, satellite, over the air) or the location of the user device (e.g., rural versus urban or State X versus State Y). Thus, the game server is able to distribute the statistical information accordingly to each cohort or group of users. The amount of delay could be based on other factors as well. In some embodiments, the amount of delay is automatically detected and/or the statistical information is synchronized with the video content. For example, using any of the synchronization implementations described in U.S. Pat. No. 8,705,195, which is hereby incorporated by reference in its entirety for all purposes, such as watermarking, footprints, and/or automatic content recognition, the server and/or the user device synchronize the statistical information with the video content. For example, the server determines using automatic content recognition that a strike was just called with Player X batting, so the statistical information of a strike is updated/displayed.

In some embodiments, a lockout signal is sent or triggered based on the receipt of the statistical information. For example, when the statistical information is received at a user device, a lockout signal is triggered. Furthering the example, the earliest receipt of the statistical information triggers the lockout signal (e.g., a lockout signal is sent to all user devices and/or an application prevents a selection of a response after the lockout is triggered).

Figure 4:
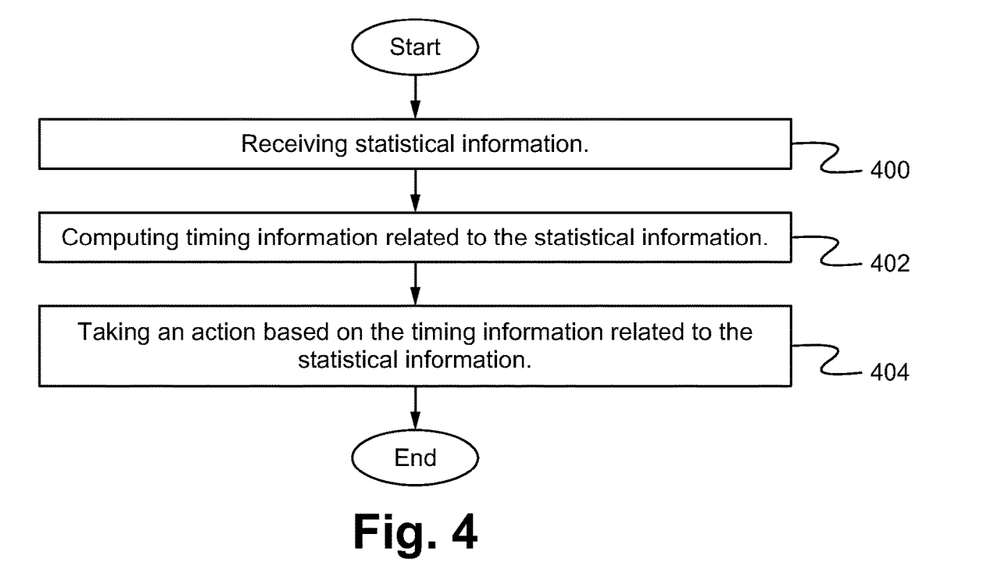
FIG. 4 illustrates a flowchart of a method of utilizing statistical information with the multiple contests of skill or chance according to some embodiments.

FIG. 4 illustrates a flowchart of a method of utilizing statistical information with the multiple contests of skill or chance according to some embodiments. In the step 400, statistical information is received. The statistical information is able to be received from any source such as stats.com. The statistical information is received at any device such as a server and/or user devices. In the step 402, timing information related to the statistical information is computed. Computing the timing information is able to include computing the time from when video content is received and when the statistical information is received at user devices. Computing the timing information is able to include computing the time from when a live action occurs (e.g., a pitch called a strike) to when the statistical information is received at the server or the user devices (or specific user devices). For example, the statistical information may be received at different user devices at different times. In the step 404, an action is taken based on the timing information related to the statistical information. For example, transmission of the statistical information from the server to the user devices is delayed (possibly different amounts of delay for different devices), or display of the statistical information on the user devices is delayed. In another example, lockout signals are based on the timing information and/or when the statistical information is received at user devices. In some embodiments, fewer or additional steps are implemented. In some embodiments, the order of the steps is modified.

To address the many problems facing distributed gaming as described herein, many companies have implemented various technological solutions such as limiting the number of users permitted to play at a certain time or providing faster servers or other networking equipment. Time-sensitive distributed gaming faces additional problems such as ensuring players do not have any unfair competitive advantages such as providing answers/selections after a designated time. Others have addressed the timing problems by asking questions well in advance, so that the users answer the questions or make their selections well before any advantageous information is revealed. By utilizing time-sensitive lockouts as described herein, which lock out players based on some threshold (e.g., a time, a detected action, a user-triggered action), improper competitive advantages and cheating are avoided. Efficiently locating participants is another challenge of distributed gaming. As described herein, social networking is able to be utilized to efficiently find and invite participants to the distributed game. By utilizing social networking, users with common interests are able to be invited which increases the likelihood of participation which also reduces the amount of network traffic as there will be fewer people who are contacted who reject or disregard the invitation. A solution to the problem of large amounts of network data involves utilizing multiple servers which are able to be positioned appropriately to serve users based on geographic proximity, as described herein. Another solution is to utilize distributed computing such as enabling the end user devices to process results and scoring, as described herein. For distributed gaming based on received external content (e.g., a telecast) where users may receive the external content at slightly different times (e.g., based on transmission delays due to technological issues such as timing differences of servers, switches, routers or distribution devices), a way of equalizing the differences using technological solutions (e.g., calculating a delay based on timestamps of when content is sent and received, or comparing receipt times of content for different devices) ensures the game is executed fairly and properly. Furthermore, a game in which a group of participants is at a complete disadvantage (e.g., they receive data 7 seconds later than everyone else) may lose a substantial number of participants, as no one wants to participate in an unfair game. Therefore, implementations described herein of equalizing the receipt of content in any manner such as by adding delays or providing lockouts at appropriate times based on transmission differences are technological solutions to technological problems.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   providing a real-time competition, wherein providing the real-time competition includes:
      determining an amount of delay for participants of the real-time competition; and
      sending a lockout signal at a time based on the amount of delay to prevent the participants from submitting a response to the real-time competition;
   wherein the real-time competition comprises a plurality of real-time selections;
   providing a non-real-time competition, wherein the non-real-time competition comprises a plurality of non-real-time selections, wherein the real-time competition and the non-real-time competition are distinct and separate but related to a same one or more events; and
   scoring a separate competition based on averaging results of the real-time competition and the non-real-time competition, to determine winners of the separate competition, wherein the separate competition is based on the same one or more events, wherein the participants participate in the same real-time competition, the same non-real-time competition and the same separate competition.

2. The method of claim 1 wherein the one or more events comprise a set of events and a subset of the set of events.

3. The method of claim 1 wherein the real-time competition and the non-real-time competition occur on a same day.

4. The method of claim 1 wherein for a user participant to participate in the non-real-time competition, the participant selects the non-real-time competition before the real-time competition begins.

5. The method of claim 1 wherein combining the scores from each of the real-time competition and the non-real-time competition includes averaging final standings from each of the real-time competition and the non-real-time competition to generate a single score used to determine a separate combined winner of the separate competition.

6. The method of claim 1 further comprising verifying the scores for the real-time competition and the non-real-time competition by comparing results maintained on a mobile device.

7. The method of claim 1 wherein real-time updates of combined results are sent only to devices of participants entered into the separate competition.

8. The method of claim 1 wherein the one or more events include: a live sports competition, an esport competition, or a television based competition.

9. The method of claim 1 wherein the real-time competition comprises a contest of skill.

10. The method of claim 1 wherein the non-real time competition comprises a contest of skill.

11. The method of claim 1 wherein responses to the non-real-time competition are locked with the beginning of the real-time competition.

12. The method of claim 1 wherein the non-real-time competition comprises a fantasy based game of skill and the real-time competition comprises a prediction-based contest based on a live event.

13. The method of claim 1 wherein one of the real-time competition and the non-real-time competition is weighted more than the other.

14. The method of claim 1 wherein scoring the separate competition is based on averaging the results of the real-time competition and the non-real-time competition, to determine the winners of the separate competition is performed by a server.

15. The method of claim 1 wherein the non-real-time competition comprises a game of chance.

16. The method of claim 1 wherein scoring the separate competition based on averaging results of the real-time competition and the non-real-time competition comprises averaging a first result from the real-time competition for a participant, wherein the first result comprises a first percentile and a second result from the non-real-time competition for the participant wherein the second result comprises a second percentile, such that the averaged first result and second result generate a total result which comprises a third percentile.

17. The method of claim 1 wherein eligibility for one of the real-time competition, non-real-time competition and the separate competition is based on a geographic location of a participant.

18. The method of claim 1 wherein the real-time competition comprises a contest of skill and the non-real-time competition comprises a contest of skill.

19. The method of claim 1 wherein the real-time competition comprises a contest of chance and the non-real-time competition comprises a contest of skill.

20. The method of claim 1 wherein the real-time competition comprises a contest of skill and the non-real-time competition comprises a contest of chance.

21. The method of claim 1 wherein the real-time competition comprises a contest of chance and the non-real-time competition comprises a contest of chance.

22. A device comprising:
a non-transitory memory for storing an application, the application for:
providing a real-time competition, wherein the real-time competition comprises a plurality of real-time selections;
providing a non-real-time competition, wherein the non-real-time competition comprises a plurality of non-real-time selections, wherein the real-time competition and the non-real-time competition are related to a same event, wherein providing the real-time competition includes:
determining an amount of delay for participants of the real-time competition; and
sending a lockout signal at a time based on the amount of delay to prevent the participants from submitting a response to the real-time competition; and
scoring the real-time competition and the non-real-time competition, including averaging scores from each of the real-time competition and the non-real-time competition to generate a separate competition, wherein the separate competition is based on the same event, wherein the participants participate in the same real-time competition, the same non-real-time competition and the same separate competition; and
a processor for processing the application.

23. The device of claim 22 wherein the same event includes a set of events for the non-real-time competition and a subset of the set of events for the real-time competition.

24. The device of claim 22 wherein the real-time competition occurs over a duration of a set period of time, and wherein the non-real-time competition is separately scored based on events occurring in real time.

25. The device of claim 22 wherein for a user participant to participate in the non-real-time competition, the participant selects the non-real-time competition before the real-time competition begins.

26. The device of claim 22 wherein current standings in the real-time competition and the non-real-time competition are completed and displayed in real-time only to devices of participants in the separate competition.

27. The device of claim 22 further comprising verifying the scores for the real-time competition and the non-real-time competition by comparing mobile device information at a central server.

28. The device of claim 27 wherein the mobile device information comprises a cellular phone number.

29. The device of claim 22 wherein the same event includes at least one of a live sports competition, an esport competition, or a television based competition.

30. The device of claim 22 wherein the real-time competition comprises a contest of skill.

31. The device of claim 22 wherein the non-real time competition comprises a contest of skill or a game of chance.

32. The device of claim 22 wherein responses to the non-real-time competition are locked with the beginning of the real-time competition.

33. The device of claim 22 wherein the non-real-time competition comprises a fantasy based game of skill and the real-time competition comprises a prediction-based contest based on a live event.

34. The device of claim 22 wherein one of the real-time competition and the non-real-time competition is weighted more than the other.

35. The device of claim 22 wherein the device comprises an end user device.

36. The device of claim 22 wherein eligibility for one of the real-time competition, non-real-time competition and the separate competition is based on a geographic location of a participant.

37. The device of claim 22 wherein the real-time competition comprises a contest of skill and the non-real-time competition comprises a contest of skill.

38. The device of claim 22 wherein the real-time competition comprises a contest of chance and the non-real-time competition comprises a contest of skill.

39. The device of claim 22 wherein the real-time competition comprises a contest of skill and the non-real-time competition comprises a contest of chance.

40. The device of claim 22 wherein the real-time competition comprises a contest of chance and the non-real-time competition comprises a contest of chance.

41. A network of devices comprising:
a non-real-time server for managing a daily fantasy competition, wherein the daily fantasy competition includes participants selecting players to form a team, wherein the team is used to compete against other participants, wherein the daily fantasy competition comprises a plurality of non-real-time daily fantasy selections;
a real-time server for managing a real-time skill-based competition, wherein the real-time skill-based competition comprises a plurality of real-time selections, wherein managing the real-time skill-based competition includes:
determining an amount of delay for participants of the real-time competition; and
sending a lockout signal at a time based on the amount of delay to prevent the participants from submitting a response to the real-time skill-based competition; and
one or more third servers for managing a combined competition, wherein the combined competition includes the daily fantasy competition and the real-time skill-based competition, including averaging scores from each of the real-time skill-based competition and the daily fantasy competition, wherein the combined competition is based on a same one or more events, wherein the participants participate in the same daily fantasy competition, the same real-time skill-based competition and the same combined competition.

42. The network of devices of claim 41 wherein the daily fantasy competition occurs over a duration of a set period of time, and wherein the real-time competition is separately scored based on events occurring in real time.

43. The network of devices of claim 41 wherein for a participant to participate in the real-time competition, the participant selects the non-real-time competition before the daily fantasy competition begins.

44. The network of devices of claim 41 wherein current standings in the real-time skill-based competition and the non-real-time daily fantasy competition are computed and displayed in real-time only to devices of participants in the combined competition.

45. The network of devices of claim 41 further comprising verifying the scores for the daily fantasy competition and the real-time skill-based competition by comparing Internet-connected device information of an Internet-connected device at a server where data of the combined competition is maintained.

46. The network of devices of claim 45 wherein the Internet-connected device includes a mobile phone, a laptop, a personal computer, a smart television or a video game console.

47. The network of devices of claim 41 wherein the real-time server sends statistical information received from another device to a user participant device.

48. The network of devices of claim 41 wherein the same one or more events includes at least one of: a live sports competition, an esport competition, or a televised competition.

49. The network of devices of claim 41 wherein the real-time skill-based competition comprises a contest of skill.

50. The network of devices of claim 41 wherein the non-real time daily fantasy competition comprises a contest of skill.

51. The network of devices of claim 41 wherein responses to the non-real-time daily fantasy competition are locked with the beginning of the real-time skill-based competition.

52. The network of devices of claim 41 wherein the non-real-time daily fantasy competition comprises a fantasy based game of skill and the real-time skill-based competition comprises a prediction-based contest based on a live event.

53. The network of devices of claim 41 wherein one of the real-time skill-based competition and the non-real-time daily fantasy competition is weighted more than the other.

54. The network of devices of claim 41 wherein eligibility for one of the real-time skill-based competition, non-real-time daily fantasy competition and the combined competition is based on a geographic location of a participant.

55. A method programmed in a non-transitory memory of a device comprising:
providing a first competition, wherein providing the first competition includes:
determining an amount of delay for participants of the first competition; and
sending a lockout signal at a time based on the amount of delay to prevent the participants from submitting a response to the first competition, wherein the first competition comprises a plurality of real-time selections;
providing a second competition, wherein the second competition comprises a plurality of non-real-time selections, and further wherein the first competition and the second competition are distinct and separate but related to a same one or more events; and
scoring a separate third competition based on averaging results of the first competition and the second competition together, to determine winners of the separate third competition, wherein the separate third competition is based on the same one or more events, wherein the participants participate in the same first competition, the same second competition and the same separate third competition.

56. The method of claim 55 wherein the first competition is a real-time competition, and the second competition is a non-real-time competition which comprises pre-competition chance-based wagers, further wherein the non-real-time competition is closed when the real-time competition begins.

57. The method of claim 55 wherein the first competition is a real-time competition, and the second competition is a non-real-time competition which comprises pre-competition daily fantasy selections, further wherein the non-real-time competition is closed when the real-time competition begins.

58. The method of claim 55 wherein scoring the separate third competition is based on averaging the results of the first competition and the second competition, to determine the winners of the separate third competition is performed by a server.

59. A network of devices comprising:
a non-real-time server for managing a daily fantasy competition, wherein the daily fantasy competition comprises a plurality of non-real-time daily fantasy selections;
a real-time server for managing a real-time skill-based competition, wherein the real-time skill-based competition comprises a plurality of real-time selections, wherein managing the real-time skill-based competition includes:
determining an amount of delay for participants of the real-time competition; and
sending a lockout signal at a time based on the amount of delay to prevent the participants from submitting a response to the real-time skill-based competition; and
wherein the non-real-time server, the real-time server or any combination thereof is configured for managing a combined competition, wherein the combined competition includes the daily fantasy competition and the real-time skill-based competition, including averaging scores from each of the real-time skill-based competition and the daily fantasy competition, wherein the combined competition is based on a same one or more events, wherein the participants participate in the same daily fantasy competition, the same real-time skill-based competition and the same combined competition.

60. The network of devices of claim 59 wherein the daily fantasy competition occurs over a duration of a set period of time, and wherein the real-time skill-based competition is separately scored based on events occurring in real time.

61. The network of devices of claim 59 wherein for a participant to participate in the real-time skill-based competition, the user participant selects the non-real-time competition before the daily fantasy competition begins.

62. The network of devices of claim 59 wherein current standings in the real-time skill-based competition and the daily fantasy competition are computed and displayed in real-time only to devices of participants in the combined competition.

63. The network of devices of claim 59 further comprising verifying the scores for the daily fantasy competition and the real-time skill-based competition by comparing Internet-connected device information of an Internet-connected device at a server where data of the combined competition is maintained.

64. The network of devices of claim 63 wherein the Internet-connected device includes a mobile phone, a laptop, a personal computer, a smart television or a video game console.

65. The network of devices of claim 59 wherein the real-time server sends statistical information received from another device to a participant device.

66. The network of devices of claim 59 wherein the same one or more events includes at least one of: a live sports competition, an esport competition, or a televised competition.

67. The network of devices of claim 59 wherein one of the real-time skill-based competition and the daily fantasy competition is weighted more than the other.

68. The network of devices of claim 59 wherein eligibility for one of the real-time skill-based competition, daily fantasy competition and the combined competition is based on a geographic location of a participant.

69. A server comprising:
a non-transitory memory for storing an application, the application for:
finding and inviting users to be participants for a real-time competition and a non-real-time competition using social networking based on one or more common interests of the users;
providing the real-time competition, wherein the real-time competition comprises a plurality of real-time selections;
providing the non-real-time competition, wherein the non-real-time competition comprises a plurality of non-real-time selections, wherein the real-time competition and the non-real-time competition are related to a same one or more events, wherein providing the real-time competition includes:
determining an amount of delay for the participants of the real-time competition; and
sending a lockout signal at a time based on the amount of delay to prevent the participants from submitting a response to the real-time competition; and
scoring the real-time competition and the non-real-time competition, including averaging scores from each of the real-time competition and the non-real-time competition to generate a separate third competition, wherein the separate third competition is based on the same one or more events, wherein a prize pool distribution for the separate third competition is based upon average scores of the real-time competition and the non-real-time competition, wherein scoring the real-time competition includes separating the real-time competition into a plurality of separate sub-competitions and averaging the scores from the separate sub-competitions to generate an averaged real-time score, wherein the server is positioned in relation to users based on a geographic proximity of the server with the users such that the server nearest the users serves the users, wherein the real-time competition includes selecting an in-play outcome including run, pass, first down, and touchdown and further wherein the participants participate in the same real-time competition, the same non-real-time competition and the same separate third competition; and
a processor for processing the application.

70. The server of claim 69 wherein the same one or more events includes a set of events for the non-real-time competition and a subset of the set of events for the real-time competition.

71. The server of claim 69 wherein the real-time competition occurs over a duration of a set period of time, and wherein the non-real-time competition is separately scored based on the same one or more events occurring in real time.

72. The server of claim 69 wherein for a participant to participate in the non-real-time competition, the participant selects the non-real-time competition before the real-time competition begins.

73. The server of claim 69 wherein current standings in the real-time competition and the non-real-time competition are completed and displayed in real-time only to devices of participants in the separate third competition.

74. The server of claim 69 further comprising verifying the scores for the real-time competition and the non-real-time competition by comparing mobile device information at a central server.

75. The server of claim 74 wherein the mobile device information comprises a cellular phone number.

76. The server of claim 69 wherein the same one or more events include at least one of a live sports competition, an esport competition, or a television based competition.

77. The server of claim 69 wherein the real-time competition comprises a contest of skill.

78. The server of claim 69 wherein the non-real time competition comprises a contest of skill.

79. The server of claim 69 wherein responses to the non-real-time competition are locked with the beginning of the real-time competition.

80. The server of claim 69 wherein the non-real-time competition comprises a fantasy based game of skill and the real-time competition comprises a prediction-based contest based on a live event.

81. The server of claim 69 wherein one of the real-time competition and the non-real-time competition is weighted more than the other.

82. The server of claim 69 wherein eligibility for one of the real-time competition, non-real-time competition and the separate third competition is based on a geographic location of a participant.

83. The server of claim 69 wherein the real-time competition comprises a contest of skill and the non-real-time competition comprises a contest of skill.

84. The server of claim 69 wherein the real-time competition comprises a contest of chance and the non-real-time competition comprises a contest of skill.

85. The server of claim 69 wherein the real-time competition comprises a contest of skill and the non-real-time competition comprises a contest of chance.

86. The server of claim 69 wherein the real-time competition comprises a contest of chance and the non-real-time competition comprises a contest of chance.

* * * * *